(12) United States Patent
Tsunooka et al.

(10) Patent No.: US 6,716,100 B2
(45) Date of Patent: Apr. 6, 2004

(54) AIR CONDITIONING UNIT FOR VEHICLE

(75) Inventors: Tatsuo Tsunooka, Kariya (JP); Yoshinobu Mochizuki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/171,002

(22) Filed: Jun. 12, 2002

(65) Prior Publication Data

US 2003/0008610 A1 Jan. 9, 2003

(30) Foreign Application Priority Data

Jul. 4, 2001 (JP) .......................................... 2001-203664
Mar. 29, 2002 (JP) .......................................... 2002-093926

(51) Int. Cl.$^7$ ................................................. B60H 1/00
(52) U.S. Cl. ........................................ 454/143; 454/156
(58) Field of Search .................................. 454/143, 147, 454/148, 156

(56) References Cited

U.S. PATENT DOCUMENTS 4,637,297 A * 1/1987 Anneken ..................... 454/146

* cited by examiner

*Primary Examiner*—Derek Boles
(74) *Attorney, Agent, or Firm*—Harness, Dickey & Pierce, PLC

(57) ABSTRACT

In an air conditioning unit that cools a motor of a fan by partially introducing an air blown by the fan into the motor, a case has a wall for defining an air introduction chamber adjacent to an air passage. The air introduction chamber has an air inlet and an air outlet so that the blown air is partially introduced into the motor from the air passage through the air introduction chamber. The wall of the air introduction chamber slopes downwardly toward the air inlet and defines a lowest portion within the air introduction chamber. The air inlet is positioned adjacent to the lowest portion of the air introduction chamber.

21 Claims, 5 Drawing Sheets

AIR CONDITIONING UNIT FOR VEHICLE

CROSS REFERENCE TO RELATED APPLICATION

This application is based on Japanese Patent Applications No. 2001-203664 filed on Jul. 4, 2001 and No. 2002-93926 filed on Mar. 29, 2002, the disclosure of which is incorporated herein by reference.

FIELD OF THE INVENTION

The present invention relates to an air conditioning unit for a vehicle. More particularly, the present invention relates to an air conditioning unit that cools a motor of a fan by introducing a blown air into the motor.

BACKGROUND OF THE INVENTION

In an air conditioning unit for a vehicle disclosed in JP-A-10-217745 (U.S. Pat. No. 6,029,469), an air intake chamber is partitioned off in an air conditioning case adjacent to a blown air passage to partially introduce a blown air into a motor. The air intake chamber has an air inlet on a side wall and communicates with the blown air passage through the air inlet. Also, the air intake chamber communicates with an inside of the motor through a motor duct. A bottom wall of the air intake chamber slopes upwardly toward the side wall having the air inlet.

For example, while a vehicle is driven under the rain, water is likely to be sucked into an air conditioning case with air by a fan. Further, the water is likely to enter an air intake chamber through an air inlet. In the above-described air conditioning unit, since the bottom wall of the air introduction chamber slopes upwardly toward the side wall having the air inlet, the water entered the air introduction chamber is stored in the air introduction chamber. Further, the water stored in the air introduction chamber is likely to be introduced into the motor with the air, thereby causing a breakdown of the motor.

SUMMARY OF THE INVENTION

The present invention is made in view of the above problem, and an object of the present invention is to provide an air conditioning unit in which entering of water into a motor is restricted.

An air conditioning unit according to the present invention has a case, a fan installed in the case and a motor for driving the fan. The case defines an air passage through which air blown by the fan is blown out to a passenger compartment. The case has a wall for defining an air introduction chamber in the case adjacent to the air passage. The air flowing in the air passage is partially introduced into the motor through the air introduction chamber. The air introduction chamber has an air inlet to allow communication between the air introduction chamber and the air passage. The wall slopes downwardly toward the air inlet and defines a lowest portion within the air introduction chamber adjacent to the air inlet.

According to this air conditioning unit, even when water enters the air introduction chamber with the air flowing in the air passage, the water is discharged to the air passage through the air inlet under the gravity. Therefore, the water is prevented from being stored in the air introduction chamber, thereby restricting the water from entering into the motor. Accordingly, corrosion of components of the motor and freezing of the motor under cold climates are suppressed.

BRIEF DESCRIPTION OF THE DRAWINGS

Other objects, features and advantages of embodiments will become more apparent from the following detailed description made with reference to the accompanying drawings, in which.

DETAILED DESCRIPTION OF PREFERRED EMBODIMENT

Preferred embodiments of the present invention will be described hereinafter with reference to drawings.

First Embodiment

Figure 1:
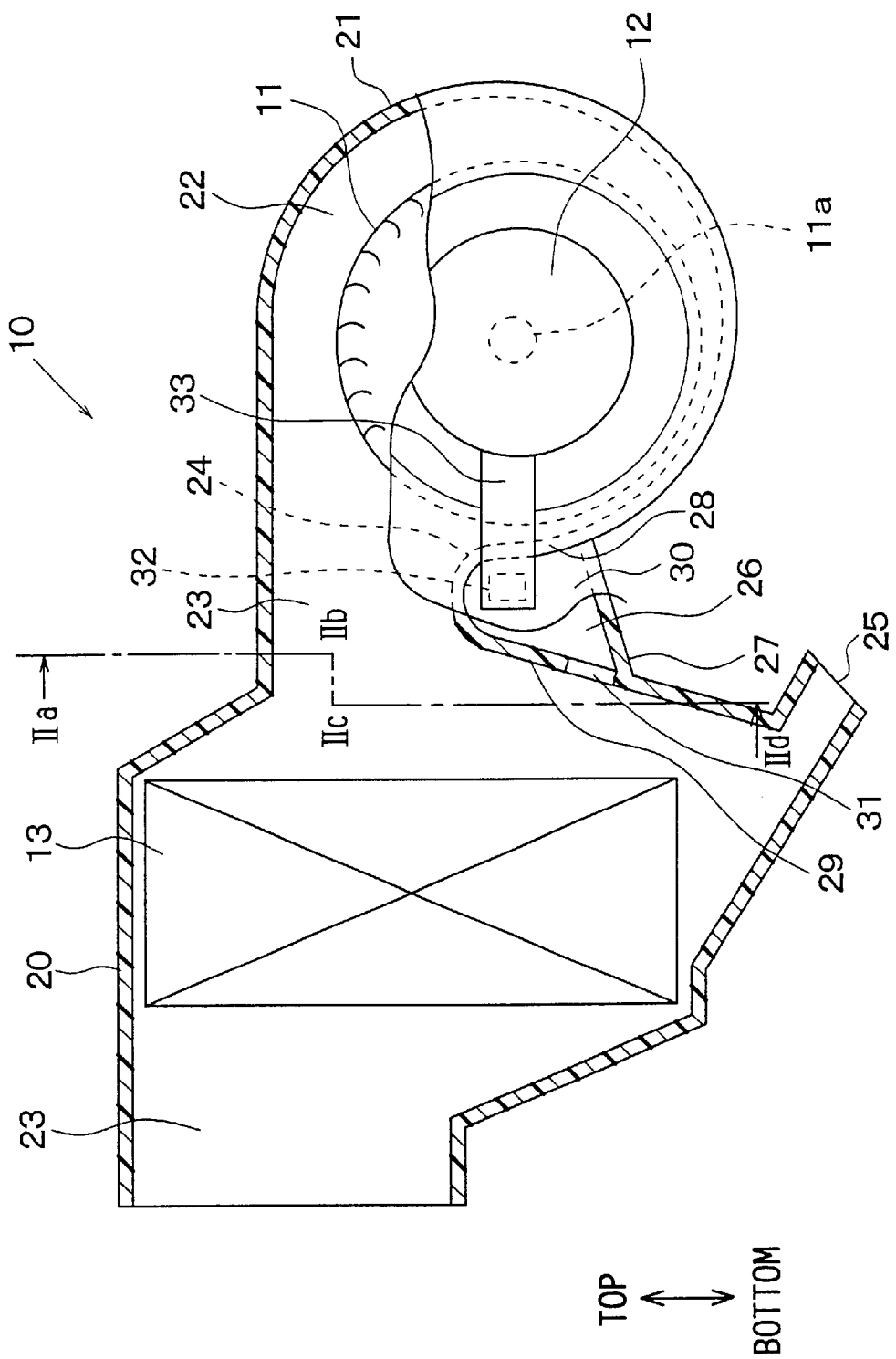
FIG. 1 is a schematic sectional view of an air conditioning unit according to the first embodiment of the present invention.
Figure 2:
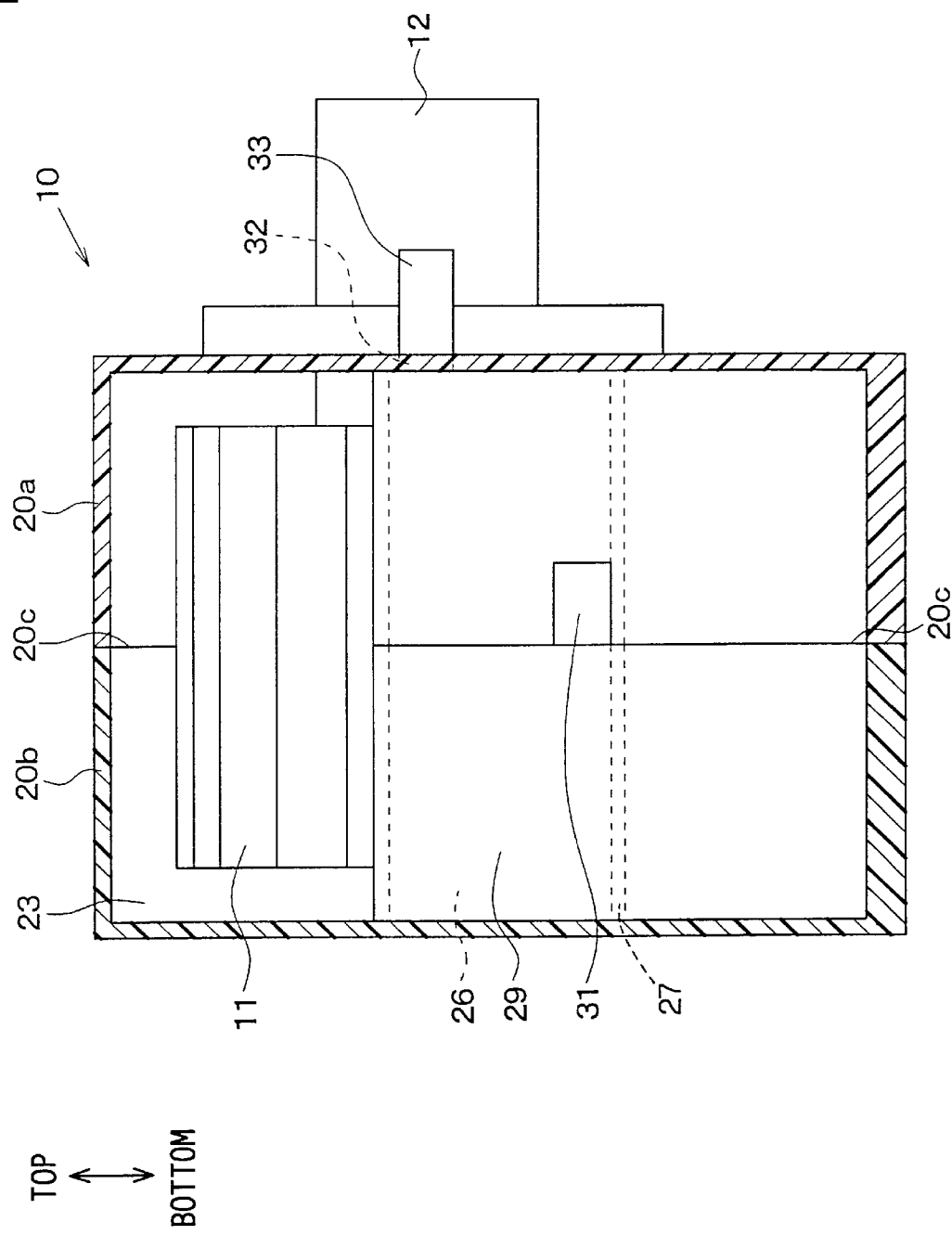
FIG. 2 is a schematic sectional view of the air conditioning unit taken along a line IIa-IIb-IIc-IId in FIG. 1.

As shown in FIGS. 1 and 2, an air conditioning unit 10 is generally installed under an instrument panel (not shown) of a vehicle, in a top and bottom direction shown. The air conditioning unit 10 has a fan 11, an electric motor 12, an evaporator 13 and a case 20. The electric motor 12 drives the fan 11 to generate an air flow. The evaporator 13 cools and dehumidifies the air blown by the fan 11. The fan 11 and the evaporator 13 are housed in the case 20 made of resin.

The fan 11 is installed in a scroll portion 21 of the case 20 such that a rotary axis 11a of the fan 11 is provided substantially perpendicular to the top and bottom direction of the air conditioning unit 10. The electric motor 12 is located on one side (right side in FIG. 2) of the fan 11 outside of the case 20. An inside and outside air switching box (not shown) is provided on the other side (left side in FIG. 2) of the fan 11. The inside and outside air switching box has an inside air intake port and an outside air intake port. The fan 11 is a centrifugal fan that draws air from the inside air intake port and the outside air intake port in a direction substantially parallel to the rotary axis 11a and blows it outwardly in the radial direction.

The outer periphery of the fan 11 and the scroll portion 21 defines a scroll channel 22 in the case 20. A blown air passage 23 for introducing the blown air is formed on a downstream air side (left side in FIG. 1) of the scroll channel 22 in the case 20. The air blown from the scroll channel 22 passes over a nose portion 24 that is a scroll starting point of the scroll portion 21.

The evaporator 13 is located in the blown air passage 23. The evaporator 13 is a heat exchanger for cooling, so the air passing through the air passage 23 is cooled and dehumidified in the evaporator 13. The evaporator 13 provides a refrigeration cycle with a compressor, a condenser, a liquid receiver and a pressure reducing device (not shown). The air passed through the air passage 23 passes through a duct (not shown) and is blown out to the passenger compartment from a grille (not shown). The case 20 has a drain port 25 under the evaporator 13 to discharge water condensed in the evaporator 13 to the outside of the case 20.

An air introduction chamber 26 is integrally formed in the case 20 adjacent to the air passage 23 and under the nose portion 24. The air introduction chamber 26 is partitioned off in the case 20 with a bottom wall 27, a first side wall 28, a second side wall 29 and third side walls 30. The third side walls 30 extend from both side ends (right side end and left side end in FIG. 2) of the bottom wall 27 to the nose portion 24. The bottom wall 27 and the third side walls 30 divide the air introduction chamber 26 from the outside of the case 20. The first side wall 28 and the second side wall 29 divide the air introduction chamber 26 from the scroll channel 22 and the air passage 23, respectively. The first side wall 28 and the second side wall 29 are joined by a curved top portion to form the nose portion 24. The second side wall 29 includes an air inlet 31 to allow the air introduction chamber 26 to communicate with the air passage 23. The third side wall 30, which is on a side of the motor 12 (right side in FIG. 2), has an air outlet 32 to allow the air introduction chamber 26 to communicate with a motor duct 33.

The bottom wall 27 slopes with respect to the horizontal direction. Specifically, the bottom wall 27 slopes downwardly from the first side wall 28 to the second side wall 29, and defines a lowest portion within the air introduction chamber 26 on a side of the second side wall 29. The air inlet 31 opens to the air introduction chamber 26 at the lowest portion of the bottom wall 27, that is, at the lowest portion of the air introduction chamber 26. More specifically, the bottom wall 27 connects with the second side wall 29 at a lowest portion of the air inlet 31. That is, the lowest portion of the air inlet 31 is on the same level as the lowest portion of the bottom wall 27. The air outlet 32 is located higher than the air inlet 31. Here, it is preferable that a tilt angle of the bottom wall 27 with respect to the horizontal direction is equal to or greater than a maximum stable tilt angle of the vehicle.

The first end of the motor duct 33 provided outside of the case 20 is connected to the air outlet 32 and the second end of the motor duct 33 is connected to the electric motor 12. The air in the air introduction chamber 26 is introduced into an inner space of the electric motor 12 through the motor duct 33. That is, the air introduction chamber 26 and the motor duct 33 provide a cooling air passage for partially introducing the blown air into the motor 12. Here, the inner space of the electric motor 12 communicates with the scroll channel 22 indirectly.

The case 20 is made of resin such as polypropylene having high mechanical strength and predetermined flexibility. The case 20 is made by injection molding. The case 20 includes a first partitioned case 20a and a second partitioned case 20b, as shown in FIG. 2. The first and second partitioned cases 20a and 20b are joined such that edges (joining surfaces) 20c of the first and second partitioned cases 20a and 20b are substantially perpendicular to the rotary axis 11a of the fan 11. Therefore, a molding die is separated from the molded partitioned case in the direction substantially parallel to the rotary axis 11a (left and right direction in FIG. 2) after injection molding. That is, a removing direction of the molding die is substantially parallel to the rotary axis 11a.

The air inlet 31 is located adjacent to the joining surface 20c and formed to extend from the joining surface 20c in the direction substantially parallel to the rotary axis 11a. For example, the partitioned case 20a has a cut out section that is recessed inwardly (to the right side in FIG. 2) from the joining surface 20c. When the joining surface 20c of the first partitioned case 20a is joined to the joining surface 20c of the second partitioned case 20b, the air inlet 31 is defined with the cut out section and a part of the joining surface 20c of the second partitioned case 20b.

The cut out section defining the air inlet 31 is formed from the joining surface 20c in the direction substantially parallel to the rotary axis 11a, and the rotary axis 11a is substantially parallel to the removing direction of the molding die. Therefore, the molding die is easily and smoothly removed after forming the partitioned cases 20a and 20b defining the air inlet 31.

Next, operation of the present embodiment is described. When the electric motor 12 drives the fan 11, air is blown to the air passage 23 through the scroll portion 22. The evaporator 13 cools and dehumidifies the air and the air is blown into the passenger compartment. The air passing through the air passage 23 is partially introduced into the air introduction chamber 26 through the air inlet 31. The air is then introduced into the motor 12 through the motor duct 33. Further, the air is returned into the scroll portion 22 after passing though the motor 12. In this way, the air cools the motor 12 while passing therethrough.

Even when water enters the case 20 with the air drawn by the fan 11 and the water enters the air introduction chamber 26 through the air inlet 31, the water is restricted from being stored in the air introduction chamber 26. The bottom wall 27 slopes downwardly toward the air inlet 31 of the second side wall 29, and the air inlet 31 opens to the air introduction chamber 26 at the lowest portion. Therefore, the water in the air introduction chamber 26 flows toward the lowest portion of the bottom wall 27, that is, toward the air inlet 31 under the gravity. Then, the water is discharged to the air passage 23 through the air inlet 31. The water is prevented from entering into the motor 12, thereby suppressing corrosion of components in the motor 12 and a freeze of the motor 12 under cold climates.

The water discharged to the air passage 23 through the air inlet 31 is further discharged from the drain port 25 with the condensed water from the evaporator 13. Since the air outlet 32 is positioned higher than the air inlet 31, water is prevented from entering the motor duct 33 from the air introduction chamber 26. Therefore, the water is securely restricted from entering into the motor 12.

In the air conditioning unit in which the fan is installed such that the rotary axis is provided horizontally and the air blown from the scroll portion passes over the nose portion, a space under the nose portion becomes dead space. However, in the air conditioning unit 10 of the present embodiment, the air introduction chamber 26 is adjacently provided underneath the nose portion 24. Therefore, the space under the nose portion 24 is effectively used.

Second Embodiment

Figure 3:
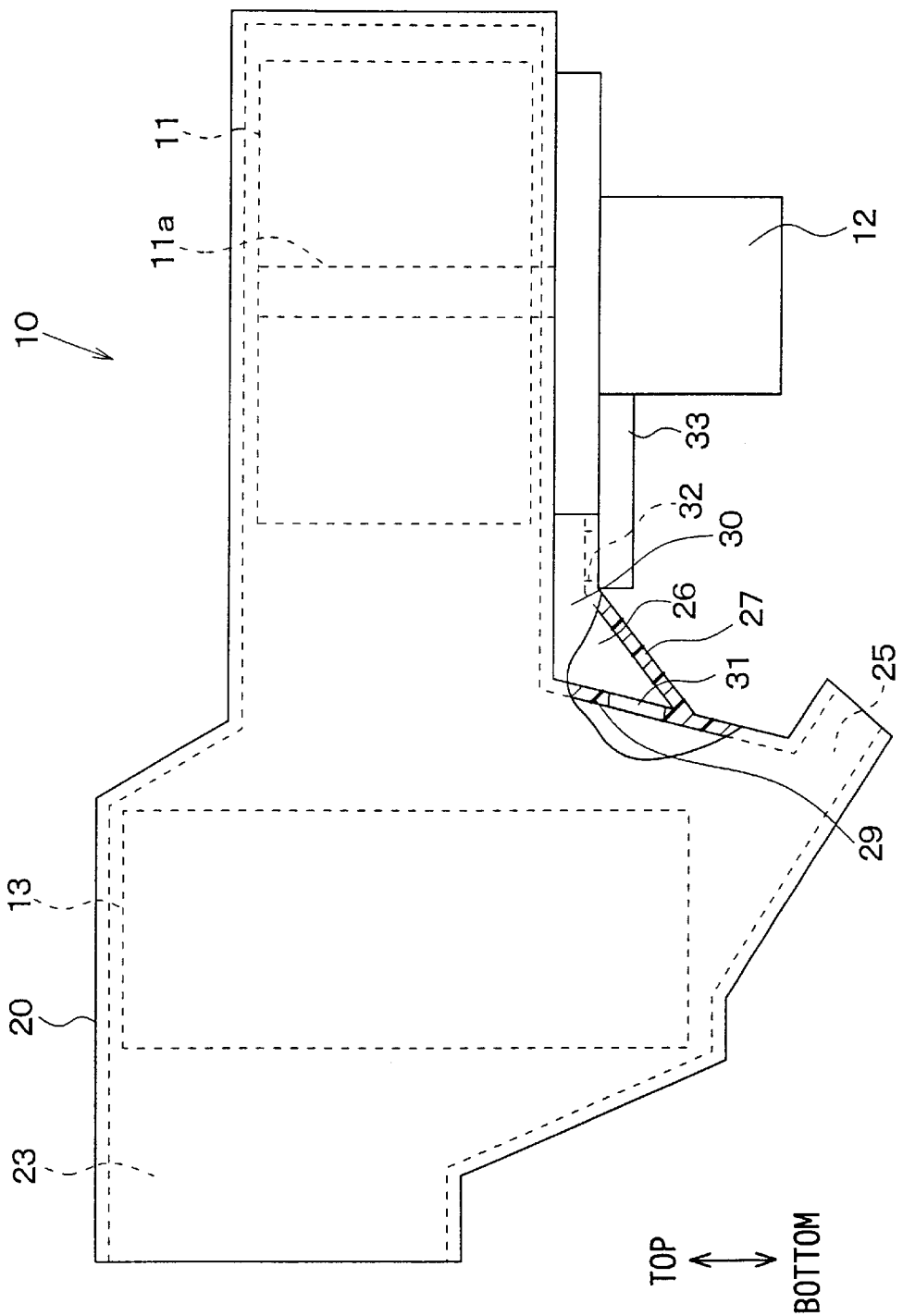
FIG. 3 is a side view of an air conditioning unit, partly in cross section, according to the second embodiment.

As shown in FIG. 3, in the second embodiment, the fan 11 is installed in the case 20 such that the rotary axis 11a is provided substantially parallel to the top and bottom direction of the case 20. Also in the present embodiment, the bottom wall 27 slopes downwardly toward the second side wall 29 and defines the lowest portion within the air introduction chamber 26. The air inlet 31 is positioned adjacent to the lowest portion of the air introduction chamber 26.

Accordingly, water entered the air introduction chamber 26 flows toward the lowest portion of the bottom wall 27, that is, toward the air inlet 31, and discharged to the air passage 23 through the air inlet 31. Since the air outlet 32 is positioned higher than the air inlet 31, the water is restricted from entering into the motor duct 33 from the air introduction chamber 26, thereby preventing the water from entering into the electric motor 12.

Third Embodiment

Figure 4:
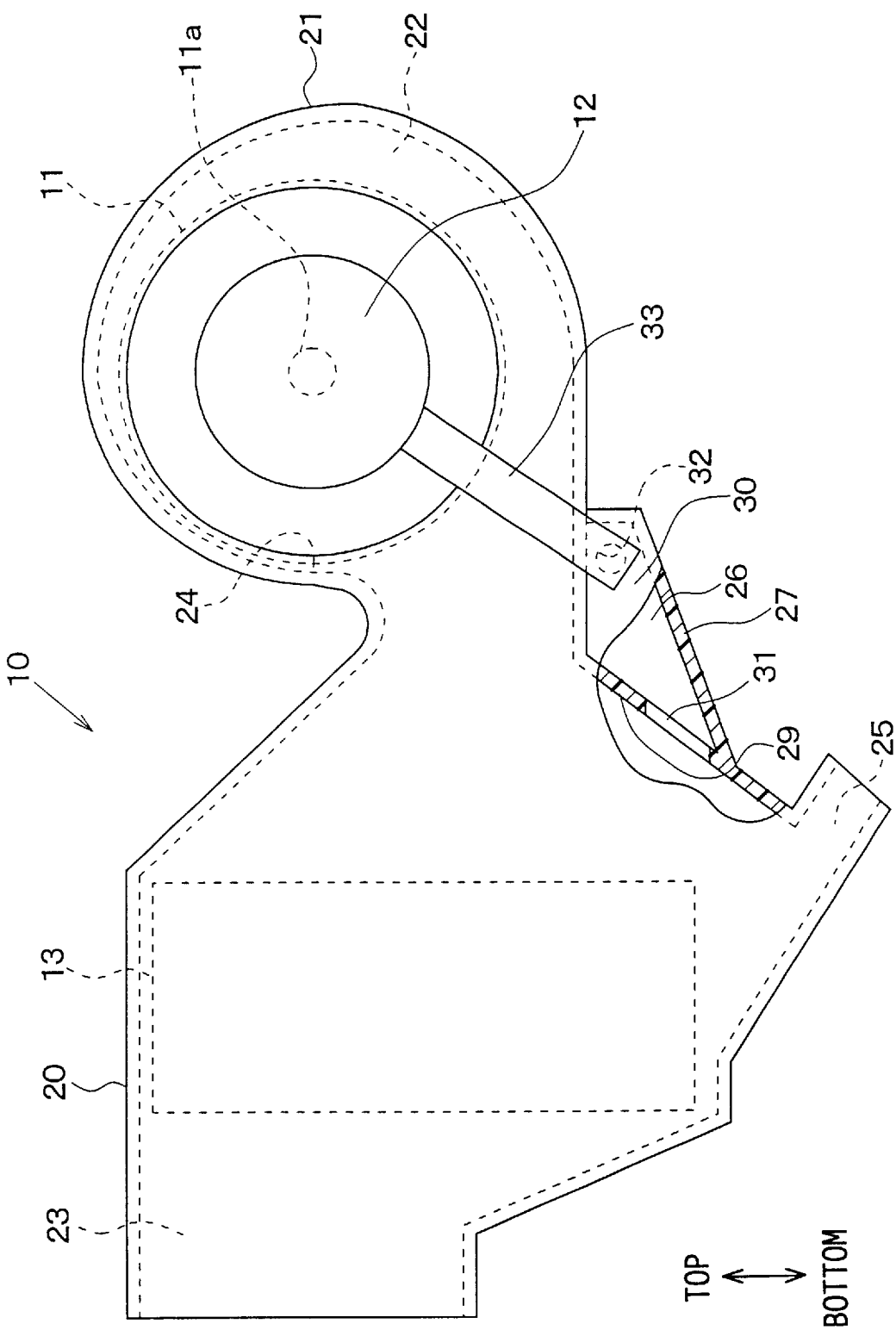
FIG. 4 is a side view of an air conditioning unit, partly in cross section according to the third embodiment.

As shown in FIG. 4, in the third embodiment, the nose portion 24 is formed on the air passage 23 such that the air blown from the scroll channel 22 passes under the nose portion 24. Also in the present embodiment, the bottom wall 27 slopes downwardly toward the second side wall 29 and the air inlet 31 opens to the air introduction chamber 26 at the lowest portion of the air introduction chamber 26.

Accordingly, the water entered the air introduction chamber 26 flows toward the lowest portion of the bottom wall 27, that is, toward the air inlet 31, under the gravity. The water is discharged to the air passage 23 through the air inlet 31. Here, the air outlet 32 is positioned higher than the air inlet 31. Therefore, the water is restricted from entering into the motor duct 33 from the air introduction chamber 26, thereby preventing the water from entering the electric motor 12.

Fourth Embodiment

Figure 5:
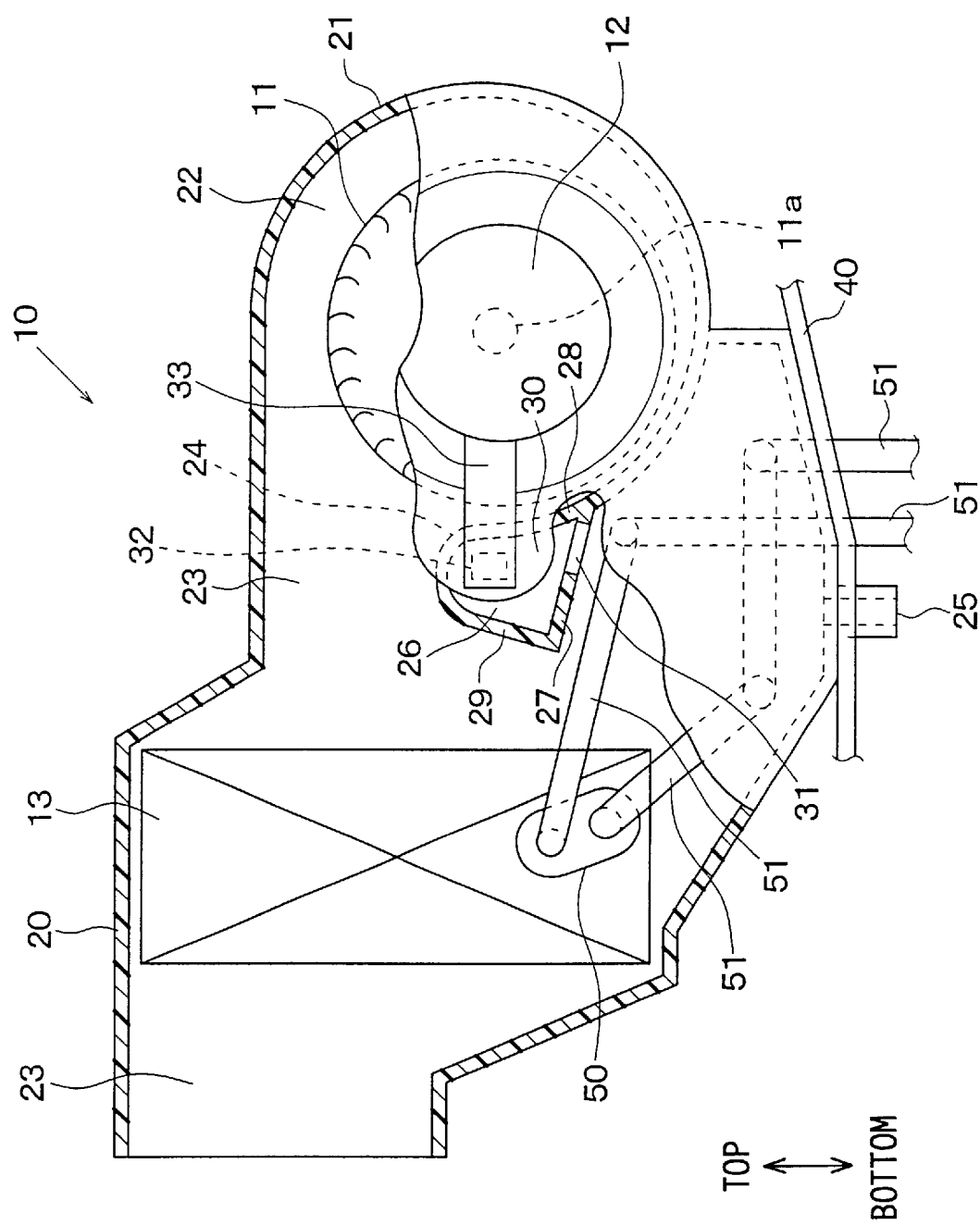
FIG. 5 is a schematic sectional view of an air conditioning unit according to the fourth embodiment.

Referring to FIG. 5, in the fourth embodiment, the air passage 23 is enlarged up to under the bottom wall 27. With this arrangement, the bottom wall 27 is located to divide the air introduction chamber 26 from the air passage 23. The bottom wall 27 slopes downwardly toward the first side wall 28 from the second side wall 29.

The air inlet 31 is formed on the bottom wall 27 adjacent to the first side wall 28 to allow the air passage 23 to communicate with the air introduction chamber 26. That is, the air inlet 31 is positioned at the lowest portion of the bottom wall 27. The air outlet 32 is positioned higher than the air inlet 31. In a case that the air inlet 31 is formed on the bottom wall 27, it is not always necessary to form the air inlet 31 at the lowest portion of the air introduction chamber 26. Even when the air inlet 31 is formed on the bottom wall 27 other than the lowest portion, an advantage similar to the case that has the air inlet 31 at the lowest portion of the bottom wall 27 can be obtained.

The air conditioning unit 10 of this embodiment is generally installed in a rear part of the passenger compartment to cool the rear part of the passenger compartment. The air conditioning unit 10 is generally installed such that the case 20 contacts with a floor 40 of the vehicle. A through hole (not shown) is formed on the floor 40 at a part which contacts with the case 20 so that the drain port 25 extends to the outside of the passenger compartment through the through hole.

A pressure reducing device 50 is connected to the evaporator 13 and coolant pipes 51 are connected to the pressure reducing device 50. The coolant pipes 51 extend to the outside of the passenger compartment through through holes that are formed on the case 20 and the floor 40. Since the through holes are formed at the parts where the case 20 and the floor 40 contacts with each other, the coolant pipes 51 do not expose in the passenger compartment. The water condensed on the coolant pipe 51 in the case 20 is discharged to the outside of the vehicle from the drain port 25 with the condensed water from the evaporator 13 and the water contained in the blown air.

Even when water is contained in the blown air, the water is restricted from entering in the air introduction chamber 26 since the air inlet 31 is formed on the bottom wall 27. Further, even if the water enters the air introduction chamber 26, the water flows out to the air passage 23 from the air inlet 31 under the gravity since the air inlet 31 is formed at the lowest portion of the bottom wall 27. Therefore, it is restricted that the water is accumulated in the air introduction chamber 26. Further, the water is prevented from entering into the electric motor 12.

In a case that the coolant pipes 51 are exposed in the passenger compartment, the water condensed on the exposed surface of the coolant pipes 51 drops on the floor 40. In that case, it is required to wrap the coolant pipes 51 with heat insulator for defrosting. However, since the coolant pipes 51 are not exposed in the passenger compartment in this embodiment, it is not necessary to wrap the coolant pipes 51 with the heat insulator. Therefore, it is possible to simplify the structure and to reduce the manufacturing cost.

As another modification, the air introduction chamber 26 can directly communicates with the electric motor 12 without the motor duct 33. Also, the present invention can be employed in an air conditioning unit in which an evaporator is located upstream from the fan 11. Further, the present invention can be employed in an air conditioning unit in which a heater core that heats blown air by using warm water or coolant from an engine as heat source is provided in an air passage.

Although the cut out section defining the air inlet 31 is formed only on the first partitioned case 20a, the cut out sections can be formed on both the first and second partitioned cases 20a and 20b. Thus, the air inlet 31 can be formed by joining two cut out sections.

In addition, in a case that the air inlet 31 is formed on the bottom wall 27 similar to the fourth embodiment, it is not always necessary that the bottom wall 27 slopes with respect to the horizontal direction. Since the air inlet 31 is positioned at the bottom of the air introduction chamber 26, it way be difficult that the water enters the air introduction chamber 26.

The present invention should not be limited to the disclosed embodiments, but may be implemented in other ways without departing from the spirit of the invention.

What is claimed is:

1. An air conditioning unit for a vehicle comprising:
a case defining an air passage through which air flows into a passenger compartment of the vehicle;
a fan provided in the case and blowing air into the air passage; and
a motor for driving the fan, wherein
the case has a wall for defining an air introduction chamber through which the air blown by the fan is partially introduced into the motor,
the air introduction chamber has an air inlet to allow the air introduction chamber to communicate with the air passage, and
the wall slopes downwardly toward the air inlet and defines a lowest portion within the air introduction chamber adjacent to the air inlet.

2. The air conditioning unit according to claim 1, wherein the air introduction chamber has an air outlet to allow the air introduction chamber to communicate with an inner space of the motor.

3. The air conditioning unit according to claim 2, wherein the air introduction chamber communicates with the inner space of the motor through a duct.

4. The air conditioning unit according to claim 2, wherein the air outlet is positioned higher than the air inlet.

5. The air conditioning unit according to claim 1, wherein the case has a scroll portion and the fan is installed in the scroll portion.

6. The air conditioning unit according to claim 1, wherein the fan is a centrifugal fan which draws air in an axial direction and blows the air outwardly in a radial direction.

7. The air conditioning unit according to claim 5, wherein the fan has a rotary axis and installed such that the rotary axis is arranged substantially horizontally.

8. The air conditioning unit according to claim 5, wherein the case has a nose portion at a scroll starting point of the scroll portion, and the air passage is formed such that the air blown by the fan passes over the nose portion.

9. The air conditioning unit according to claim 8, wherein the air introduction chamber is located underneath the nose portion.

10. The air conditioning unit according to claim 1, wherein the case has at least two partitioned cases, and the partitioned cases have joining surfaces for joining with each other.

11. The air conditioning unit according to claim 10, wherein at least one of the partitioned cases has a cut out section recessed from the joining surface, and the air inlet is defined with the cut out section and a part of the joining surface of another one of the partitioned cases when the partitioned cases are joined with each other.

12. The air conditioning unit according to claim 7, wherein the case has a first and a second partitioned cases, and the first and the second partitioned cases are joined with each other such that joining surfaces thereof are perpendicular to the rotary axis, and the first partitioned case has a cut out section that is recessed from the joining surface and the air inlet is defined with the cut out section and a part of the joining surface of the second partitioned case.

13. An air conditioning unit for a vehicle comprising:

a case defining an air passage through which air flows into a passenger compartment of the vehicle;

a fan provided in the case and creating a flow of air into the air passage; and a motor provided outside of the case for driving the fan, wherein:

the case has a side wall and a bottom wall for defining an air introduction chamber through which the air flowing in the air passage is partially introduced into the motor, the air introduction chamber has an air inlet to allow the air introduction chamber to communicate with the air passage adjacent to a lowest portion of the air introduction chamber, and the bottom wall slope downwardly toward the air inlet.

14. An air conditioning unit for a vehicle comprising:

a case defining an air passage through which air flows into a passenger compartment of the vehicle;

a fan provided in the case and creating a flow of air into the air passage; and a motor provided outside of the case for driving the fan, wherein:

the case has a side wall and a bottom wall for defining an air introduction chamber through which the air flowing in the air passage is partially introduced into the motor, the air introduction chamber has an air inlet to allow the air introduction chamber to communicate with the air passage adjacent to a lowest portion of the air introduction chamber; and the air introduction chamber is divided from the air passage with the bottom wall and the air inlet is formed on the bottom wall.

15. The air conditioning unit according to claim 14, wherein the bottom wall slopes to define the lowest portion within the air introduction chamber and the air inlet is positioned at the lowest portion.

16. An air conditioning unit for a vehicle comprising:

a case defining an air passage through which air flows into a passenger compartment of the vehicle;

a fan provided in the case and creating a flow of air into the air passage; and a motor provided outside of the case for driving the fan, wherein:

the case has a side wall and a bottom wall for defining an air introduction chamber through which the air flowing in the air passage is partially introduced into the motor, the air introduction chamber has an air inlet to allow the air introduction chamber to communicate with the air passage adjacent to a lowest portion of the air introduction chamber; and the air introduction chamber is divided from the air passage with the side wall and the air inlet is formed on the side wall.

17. The air conditioning unit according to claim 16, wherein the bottom wall slopes toward the air inlet and defines the lowest portion within the air introduction chamber adjacent to the air inlet.

18. The air conditioning unit according to claim 13, wherein the air introduction chamber is divided from the air passage with the bottom wall and the air inlet is formed on the bottom wall.

19. The air conditioning unit according to claim 18, wherein the bottom wall slopes to define the lowest portion within the air introduction chamber and the air inlet is positioned at the lowest portion.

20. The air conditioning unit according to claim 13, wherein the air introduction chamber is divided from the air passage with the side wall and the air inlet is formed on the side wall.

21. The air conditioning unit according to claim 20, wherein the bottom wall slopes toward the air inlet and defines the lowest portion within the air introduction chamber adjacent to the air inlet.

* * * * *